(12) United States Patent
Tijerina et al.

(10) Patent No.: US 7,192,081 B2
(45) Date of Patent: Mar. 20, 2007

(54) AUTOMOTIVE FRAME

(75) Inventors: Abraham Tijerina, Monterrey (MX); Hector Ramirez, San Nicolas de los Garza (MX); Humberto Molina, Guadalupe (MX); Pedro Silva, Monterrey (MX); David Bees, Nuneaton (GB); Jonathan Wortley, Shepshed (GB); Stuart McAndrew, Coventry (GB)

(73) Assignee: Metalsa Servicios S. De R.L., Apodaca (MX)

( * ) Notice: Subject to any disclaimer, the term of this patent is extended or adjusted under 35 U.S.C. 154(b) by 100 days.

(21) Appl. No.: 10/780,694

(22) Filed: Feb. 19, 2004

(65) Prior Publication Data

US 2005/0184501 A1    Aug. 25, 2005

(51) Int. Cl.
*B60R 27/00*    (2006.01)
(52) U.S. Cl. ............ 296/205; 296/193.07; 296/203.01; 296/204

(58) Field of Classification Search .......... 296/193.07, 296/187.08, 203.01, 204, 205, 203.02, 203.04
See application file for complete search history.

(56) References Cited

U.S. PATENT DOCUMENTS

| 1,797,530 | A | * | 3/1931 | Mayer ..................... 296/204 |
| 5,794,398 | A | * | 8/1998 | Kaehler et al. ............. 296/205 |
| 5,839,777 | A | * | 11/1998 | Vlahovic .................... 296/205 |
| 5,855,394 | A | * | 1/1999 | Horton et al. .............. 296/204 |
| 6,540,286 | B2 | * | 4/2003 | Takemoto et al. .......... 296/204 |
| 2001/0028179 | A1 | * | 10/2001 | Takemoto et al. .......... 296/204 |
| 2003/0137163 | A1 | * | 7/2003 | Hayashi et al. ............. 296/204 |
| 2006/0012162 | A1 | * | 1/2006 | Werner et al. .............. 280/781 |

* cited by examiner

*Primary Examiner*—Lori L. Coletta
(74) *Attorney, Agent, or Firm*—Young & Thompson

(57) ABSTRACT

A vehicle frame in which the transversal beams are linked to the longitudinal rails by means of a plurality of clamps joined by a high efficiency adherent substance.

31 Claims, 5 Drawing Sheets

AUTOMOTIVE FRAME

BACKGROUND OF THE INVENTION

A. Field of the Invention

The present invention is related to automotive frames and more particularly to an automotive frame in which it is used an adherent substance to join main structural components.

B. Description of the Related Art

The main structure of a common automotive frame generally comprises a first and a second longitudinal rails and a plurality of transversal beams joining both longitudinal rails.

Normally, the transversal beams are joined to both longitudinal rails by means of welding points or bolts, which represent potential failing points when the structure is subject to extremely high loads, opposite forces or high torsional forces.

In order to eliminate such potential failing points, applicant developed a vehicle frame in which the transversal beams are linked to the longitudinal rails by means of a plurality of clamps joined by a high efficiency adherent substance, thus avoiding the welding of elements or the use of bolt-nut assemblies to join the main structural elements.

Since the need for welding or bolting is eliminated, the vehicle frame may be produced using less energy, which reduce the overall production costs and selling costs.

Many of the common vehicle frames actually in production include additional support structures for supporting various vehicle elements. However, elements such as the front suspension support need to be designed for the particular vehicle frame in which it will be used and therefore, it can not be used in other vehicle frame designs.

Applicant's vehicle frame, is designed to attach any front suspension support design according to the current needs and allows to change the design of the front suspension support without substantially change the configuration of the vehicle frame, which help to lower development costs.

SUMMARY OF THE INVENTION

It is therefore a main object of the present invention to provide a vehicle frame in which the transversal beams are linked to the longitudinal rails by means of a plurality of clamps joined by a high efficiency adherent substance.

It is another main object of the present invention to provide a vehicle frame of the above referred nature which does not have any welding points or bolt-nut assemblies joining its main structural elements.

It is still a main object of the present invention to provide a vehicle frame of the above referred nature which does not have potential failing points formed by the use of welding points or bolt-nut assemblies for joining main structural elements.

It is an additional object of the present invention to provide a vehicle frame of the above disclosed nature which may be produced using less energy, thus reducing overall production costs and selling costs.

It is still an additional object of the present invention to provide a vehicle frame of the above disclosed nature which is designed to attach any front suspension support design according to the current needs and allows to change the design of the front suspension support without substantially change the configuration of the vehicle frame, which help to lower development costs.

These and other objects and advantages of the vehicle frame of the present invention will become apparent to those persons having an ordinary skill in the art, from the following detailed description of the embodiments of the invention, which will be made with reference to the accompanying drawings.

DETAILED DESCRIPTION OF THE INVENTION

Figure 1:
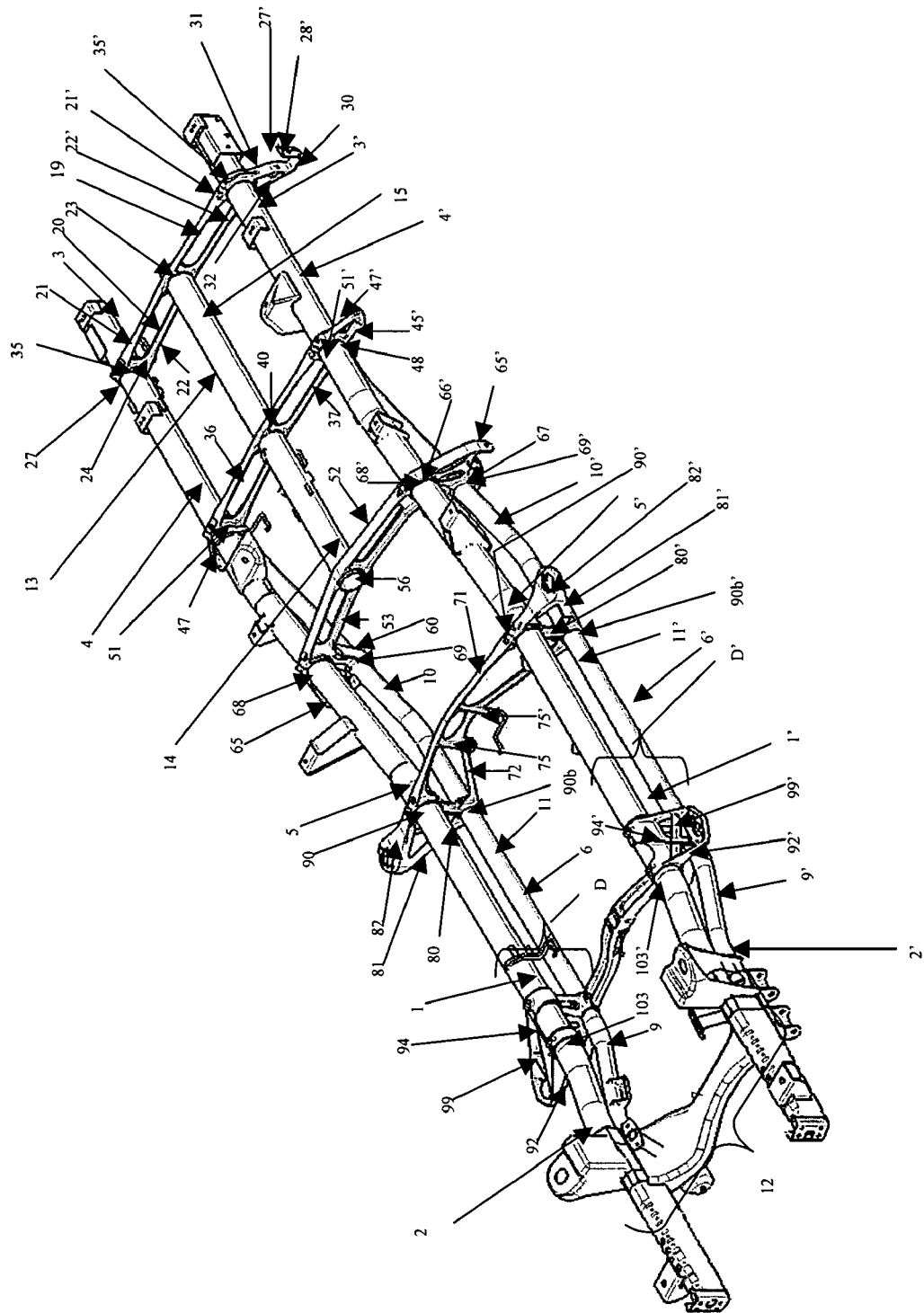
FIG. 1 is an upper perspective view of the automotive frame of the present invention showing all its components.
Figure 2:
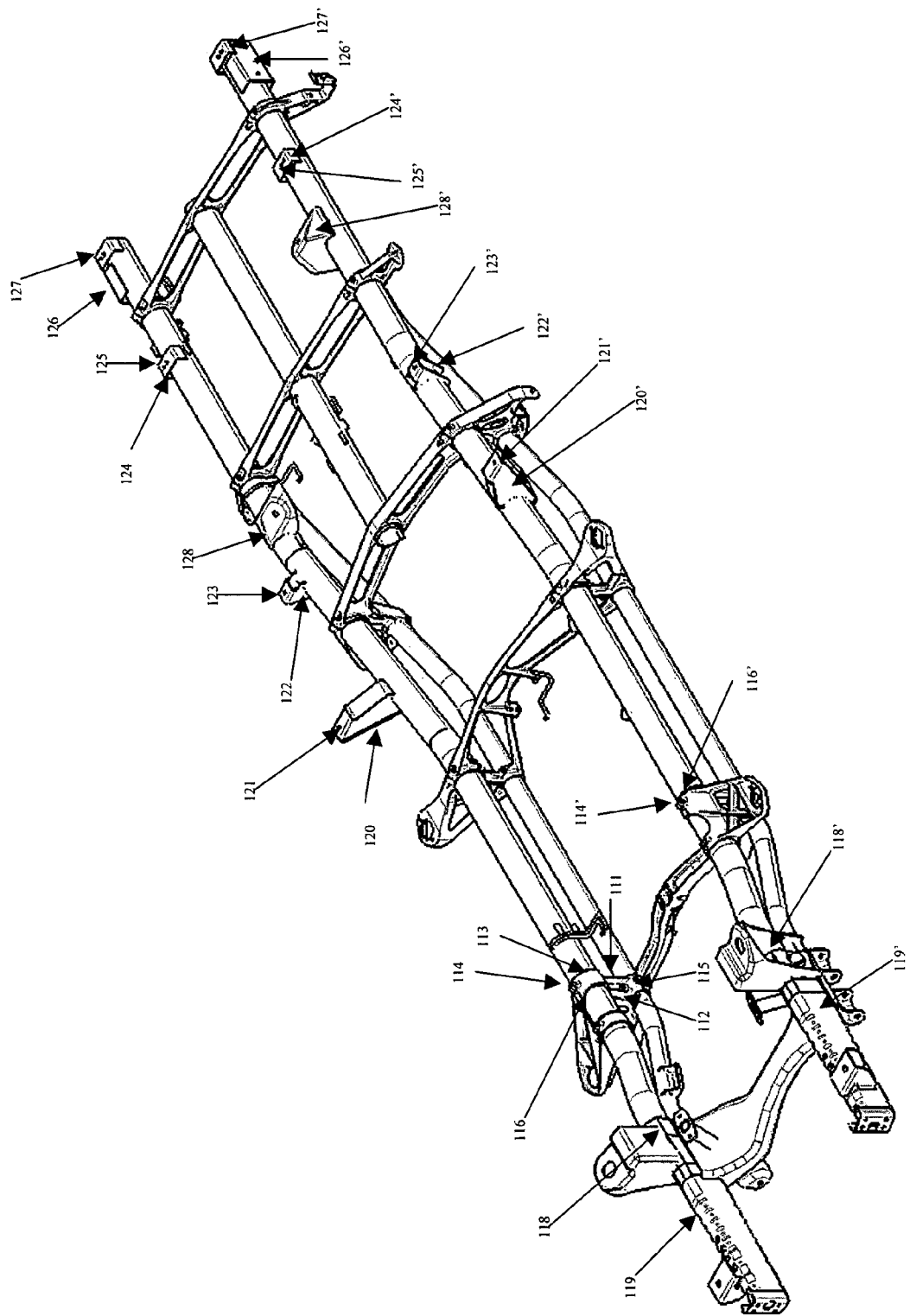
FIG. 2 is another upper perspective view of the automotive frame of the present invention showing all its components.
Figure 3:
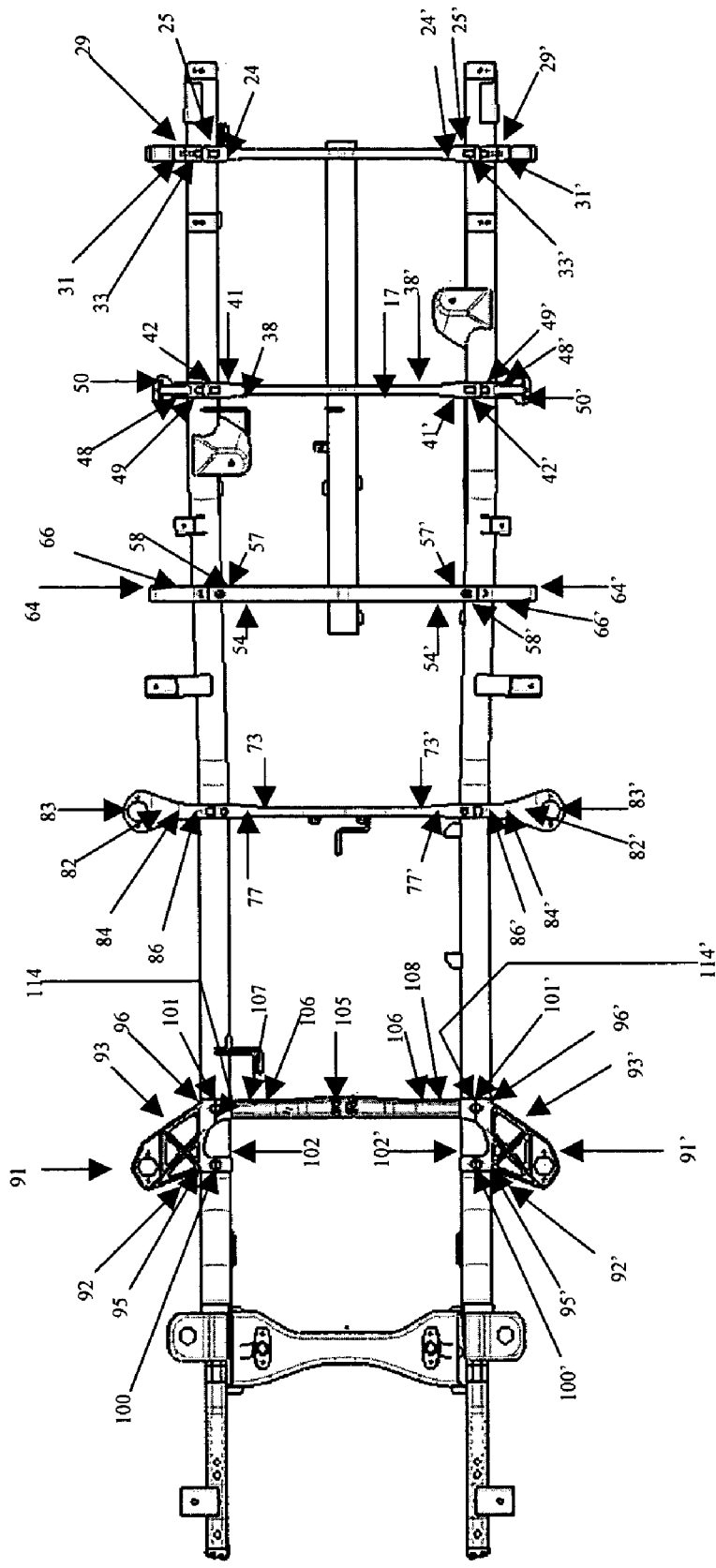
FIG. 3 is an upper view of the automotive frame of the present invention.
Figure 4:
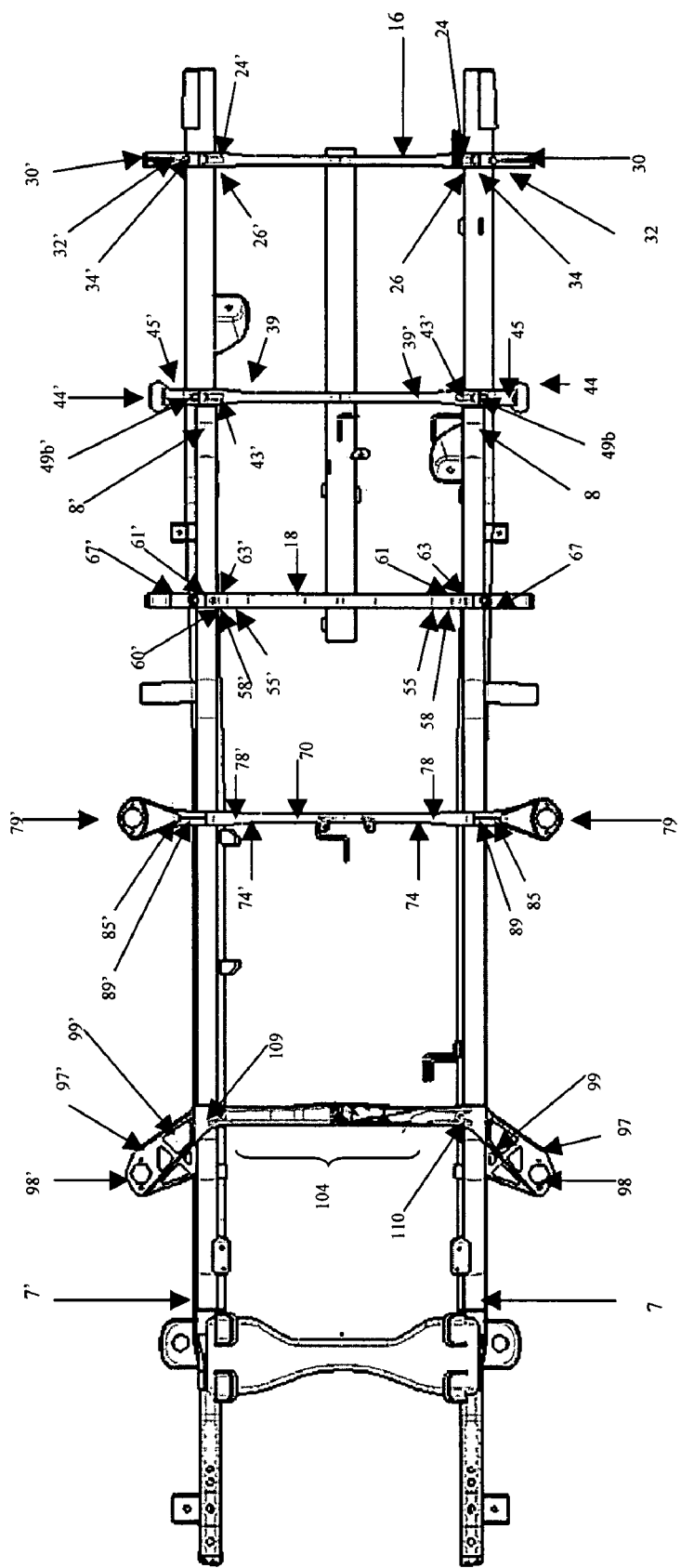
FIG. 4 is a bottom view of the automotive frame of the present invention.
Figure 5:
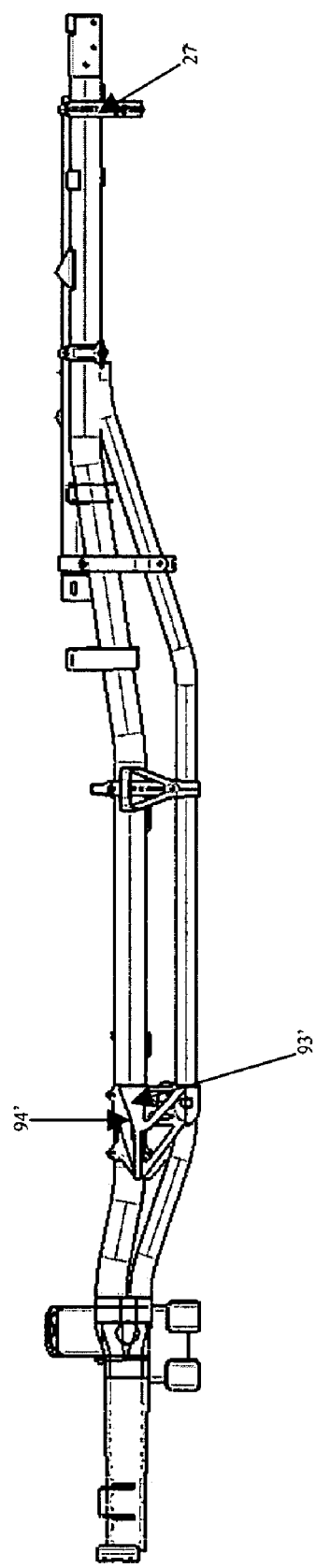
FIG. 5 is a right side view of the automotive frame of the present invention.

The invention will now be described making reference to a preferred embodiment thereof and to a specific example of the automotive frame of the present invention.

Furthermore, the automotive frame of the present invention will be described making reference to a vehicle, wherein the front of the automotive frame corresponds to the front of vehicle, the rear of the automotive frame correspond to the rear of the vehicle, the left and right of the automotive frame corresponds to the left and right of the vehicle as seen from the front respectively and above and below the automotive frame corresponds to above and below of a vehicle respectively, furthermore, any piece facing to the internal side of the automotive frame means a piece facing to the center of the automotive frame from one of its sides, and a piece facing to the external side of the automotive frame means a piece facing to a point opposite to the center of the automotive frame from one of its sides, wherein the automotive frame comprises:

a main frame assembly for supporting main operational stress comprising:

a first and a second spaced apart parallel double rails "D", "D'" each having a first and a second end and each comprising:

a main rail 1,1' each having a circular cross section, a first 2, 2' and a second 3, 3' end, a straight section 4, 4' beginning at the second end 3, 3' and finishing at approximately one quarter of the length of the main rail 1, 1' and a bent section 5, 5', slightly bent towards below and towards the external side of the automotive frame, beginning at the end of the straight section 4, 4' and finishing at the first end 2, 2' of the main rail 1, 1';

a secondary rail 6, 6' having a circular cross section and a first 7, 7' and a second 8, 8' end, each having a first 9, 9' and a second 10, 10' end bent sections slightly bent towards below of the automotive frame, and each located at the first 7, 7' and second 8, 8' end of the secondary rail 6, 6' respectively, and a central straight section 11, 11', wherein the first end bent section 9, 9' is linked to an end of a main rail bent section 5, 5' by means of a front suspension support frame 12 and wherein an end of the second bent section 10, 10' is linked to an end of a main rail straight section 4, 4' by welding and wherein each fist and second secondary rail 6, 6' are located in a parallel relationship to each main rail 1, 1';

a central rail 13 having a length of approximately one third of the length of a parallel double rail, a circular cross section and a first 14 and a second 15 end, located between the first "D" and second "D'" double rails and linked to them by means of three spaced apart support transversal beams 16, 17, 18;

linking means for linking the first "D" and second "D'" double rails and the central rail 13 together, and for supporting various vehicle elements comprising:

a first transversal support beam 16 comprising a first 19 and a second 20 longitudinal and parallel elongated members, each slightly bent at its central portion towards below of the automotive frame and having a first and a second end 21, 21', 22, 22', and joined at its central portion by means of a central "O" ring 23 for receiving the second end 15 of the central rail 13 and by means of two half clamps 24, 24' each vertically oriented and opened to the external side of the automotive frame, joining the first and second end of the elongated members 21, 21', 22, 22', and having a superior 25, 25' and inferior 26, 26' bolt receiving member;

a first and a second rear spring support 27, 27', each having a spring support element 28, 28' and a half clamp 29, 29' vertically oriented and opened to the internal side of the automotive frame, wherein the half clamp 29, 29' and the spring support 28, 28' are connected by means of a flat elongated piece 30, 30' and two curved elongated pieces 31, 31', 32, 32' each joined by one of its end to an end of the half clamp 29, 29' and joined together by its opposite ends for joining the spring support element 28, 28', and wherein each half clamp 29, 29' includes a superior 33, 33' and a inferior 34, 34' bolt receiving member, and closes the half clamps of the first transversal support beam 16 in such way that each one of its bolt receiving members coincide and receive a bolt-nut assembly thus forming and "O" shaped ring 35, 35' for receiving and joining the cross section of the second end of a main rail by means of an adherent substance applied to the "O" shaped ring 35 thus joining the second end of the main rails 1, 1' and the central rail 13 at its second end 15;

a second transversal support beam 17 serving as a spare tire support, comprising a first 36 and a second 37 longitudinal and parallel elongated member each slightly bent at its central portion towards below of the automotive frame and each having a first and a second end 38, 38', 39, 39', and each joined to each other at its central portion by means of a central "O" ring 40 for receiving the cross section of the central rail 13 at its central portion and by means of two half clamps 41, 41' vertically oriented and opened to the external side of the automotive frame, joining the first and second end of the elongated members 38, 38', 39, 39', each having a superior and inferior bolt receiving member 42, 42', 43', 43';

a first 44 and a second 44' rear axle auxiliary support each comprising a triangular frame having an horizontal side 45, 45', a vertical side and an inclined side 47, 47' (hypotenuse) wherein the vertical side comprises a half clamp 48, 48' vertically oriented and opened to the internal side of the vehicle frame, each one having a superior 49, 49' and an inferior 49b, 49b' bolt receiving member 49, 49' and the opposite edge including a rear axle support element 50, 50', and wherein each half clamp 48, 48' closes the first and second half clamps 41. 41' of the second transversal support beam 17 in such way that its bolt receiving members coincide and receive a bolt-nut assembly, thus forming and "O" shaped ring 51, 51' for receiving and joining the cross section of a main rail 1. 1' at its first quarter portion by means of an adherent substance applied to the "O" ring 51, 51' thus joining the first and second main rails 1, 1' at approximately its first quarter portion and the central rail 13 at its central portion;

a third transversal support beam 18 serving as an auxiliary gas tank support, comprising a first 52 and a second 53 longitudinal and parallel elongated members each having a first and a second end 54, 54', 55, 55' and bent at its central portion forming a non-pronounced inverted "V" shaped piece, each joined at its central portion by means of a central "O" ring 56 for receiving the first end 15 of the central rail 13 cross section and by means of a first pair of half clamps 57, 57' each vertically oriented, opened to the internal side of the frame and having a superior 58, 58' and an inferior 59, 59' bolt receiving member, joining the ends of the elongated members 52, 53, and wherein the first 54' and second end 55' of the second elongated member 53 each including a prolongation 60, 60' bent at an angle of 90° for joining one half clamp of a second pair of half clamps 61, 61', each located below and next to one of the first pair of half clamps 57. 57' and each having a superior 62, 62' and an inferior 63, 63' bolt receiving member;

a first and a second front spring support 64, 64' each having a first end including a spring support element 65, 65' and a second end including a first 66, 66' and a second 67, 67' half clamp located below the first half clamp 66, 66' forming a pair of half clamps, each vertically oriented, opened to the internal side of the frame and including a superior and an inferior bolt receiving member (not shown), all connected by a triangular shaped frame 68, 68', wherein the pair of half clamps 66, 66', 67, 67' of each spring support 65, 65' close a corresponding pair of half clamps 57. 57', 61, 61' of the third transversal support beam 18 in such way that its bolt receiving members coincide and receive a bolt-nut assembly, thus forming a first 68, 68' and a second 69, 69' "O" shaped ring for receiving and joining the cross section of a main rail at approximately its half second quarter portion and the cross section of a secondary rail at the central portion of its second bent section by means of an adherent substance applied to each "O" ring thus joining each main 1, 1' and secondary rail 6, 6' of each double rail "D", "D'" and both double rails "D", "D'" together;

a gas tank transversal support beam 70 comprising a first 71 and a second 72 longitudinal and parallel elongated member, each having a first and a second 73, 73', 74, 74' end, wherein the first elongated member 71 is bent at its central portion forming a non-pronounced inverted "V" shaped piece and the second elongated member 72 is bent at its central portion forming a pronounced inverted "V" shaped piece, both joined by its central portion by means of two vertical and parallel elongated members 75, 75' each having a first end and a second end and each having a perforation (not shown) at its second end, thus forming a central "H" shaped pattern, and further including a first pair of half clamps 77, 77', joined at both ends 73, 73' of the first longitudinal elongated member 71 and a second pair of half clamps 78, 78' joined at both ends 74, 74' of the second longitudinal elongated member 72, each opened to the external side of the automotive frame.

a first and a second 2nd$^t$ cabin support 79, 79' having a closed "V" shape comprised by a first 80, 80' and a second 81, 81' main elongated metallic members and a superior planar elongated member 82, 82' closing the "V" shape and forming a cabin support having a pallet shape including a bore 83, 83' in its widest portion, wherein the union of the superior planar elongated member 82, 82' with the first main elongated metallic member 80, 80' include a first half clamp 84, 84' opened to the internal side of the frame and the union of the first 80, 80' and second 81, 81' main elongated members forms a second half clamp 85, 85' opened to the internal side of the frame, each including a superior 86. 86' and an inferior bolt receiving member 89, 89' (only the superior bolt receiving member of the first half clamp and the inferior bolt receiving member of the second half clamp shown) and each closing a half clamp of the first 77, 77' and second 78, 78' pair of half clamps of the gas tank transversal support beam 70 respectively, in such way that its bolt receiving members coincide and receive a bolt-nut assembly, thus forming a first 90, 90' and a second 90b, 90b' "O" ring receiving and joining the cross section of a main rail at approximately its half third quarter portion and the cross section of the secondary crossbar at approximately its central portion respectively by means of an adherent substance applied to the first 90 and second 90' "O" rings, thus joining the main 1, 1' and secondary rails 6, 6' of each double rail "D", "D'" and both double rails "D", "D'" together;

a first and a second 1$^{st}$ cabin support 91, 91' each comprising a semi-solid polygonal triangular shaped piece having a first 92, 92' and a second 93' 93' lateral triangular planar member each having a width and including a vertical side having a superior and an inferior end, an horizontal side having a first and a second end and an inclined side (hypotenuse) having a first and a second end, a superior elongated member 94, 94' joined between both lateral triangular planar members 92, 92', 93, 93' at the edges of the first end of its vertical side, forming a first 95, 95' and a second 96, 96' vertically oriented half clamp for receiving the half last quarter of a main rail, 1, 1', each facing to the internal side of the frame member and having a superior and an inferior end, an inferior horizontal pentagonal shaped planar member 97, 97' having a circular opening 98' 98' in a central portion thereof, joined between both lateral triangular planar members 92, 92', 93' 93' at the edge thereof wherein the first end of the inclined and horizontal sides coincide, a pair of rounded rail receiving sections (not shown) joined to the second end of the triangular planar member vertical side for receiving and adhering to the half last quarter of a secondary rail 6, 6' by means of an adherent substance, a reinforcing structure 99, 99' located between both lateral triangular planar members 92, 92', 93, 93' and between the superior elongated member 94, 94' and the inferior horizontal pentagonal shaped planar member 97, 97', linking them and a first 100, 100' and a second 101, 101' bolt receiving members welded to the tip of the superior end of both clamps 95, 95', 96, 96' and wherein the second triangular planar member 93, 93' has a bore (not shown) at the second end of its vertical side and a bore (not shown) near the first end of its horizontal side above the rounded rail receiving sections, and wherein each triangular planar members 93, 93', 94, 94' is slightly inclined with respect to the superior elongated member 94, 94' and the inferior horizontal pentagonal shaped planar member 97, 97' towards the front of the vehicle frame. A sole half clamp 102, 102' vertically oriented, opened to the external side of the vehicle frame and having a superior bolt receiving section, closes the second half clamp 96, 96' of the cabin support superior elongated member, in such way that its bolt receiving members coincide and receive a bolt-nut assembly, thus forming an "O" ring 103, 103' receiving and joining the cross section of a main rail 1, 1' near its first end by means of an adherent substance applied to the "O" ring, 103, 103';

a transmission support beam 104 comprising an elongated channeled member having an "H" shaped cross section and including a bent inverted "U" shaped central portion 105 and two straight portions 106, 106' at both sides, forming the transmission support beam first 107 and second end 108, each including a nut receiving perforation (not shown), and further including a first 109, and a second 110 half clamp respectively, horizontally oriented and opened upward, each one joined at the first 107 and second end 108 and each having a nut receiving perforation (not shown), wherein each half clamp 109, 109', 110, 110' surrounds the lower portion of a secondary rail near its second end and is linked to a 1$^{st}$ cabin support 91, 91', by means of a nut-bolt assembly passing trough the nut receiving section and trough the perforation located at the second end of the cabin support rectangular planar member 97, 97' horizontal side which coincide with the nut receiving perforation;

a first 111 and a second (not shown) cabin support linking member, for linking each 1$^{st}$ cabin support to the main 1, 1' and secondary 6, 6' rails, each comprising a vertical planar member 112 having a superior end including a vertical half clamp 113 opened to the external side of the automotive frame having a bolt receiving member 114, 114' at its tip, for receiving a main rail 1, 1', and an inferior end including a rounded rail receiving section (not shown) for receiving a secondary rail 6, 6', wherein each vertical planar member 112, 112' including a bolt receiving perforation 115 near its second end and wherein the rounded rail receiving section having an horizontal bolt receiving member (not shown) at its end. The half clamp 113, 113' close the first cabin support half clamp 95, 95' in such way that both bolt receiving members coincide and receive a bolt-nut assembly thus forming an "O" ring 116, 116' receiving and joining the cross section of a main rail 1', 1' by means of an adherent substance applied to the "O" ring 116, 116', and the rounded rail receiving section is adhered to the secondary rail 6, 6' by means of an adherent substance. In this way the last quarter of each secondary rail and main rail is surrounded and supported by a half clamp 109, 110 of the transmission support beam 104, and the rounded receiving sections of a 1$^{st}$ cabin support 91' 91' and a cabin support linking member 111, 111'. Thus, by means of each cabin support 91, 91', cabin support linking member 111, 111' and the transmission support beam 104, both double rails "D", "D'" are joined.

a front suspension support frame 12 having a first 118 and a second 118' double rail receiving section for joining the first end 2, 2' of the first and the second double rail 1, 1' and a first 119 and a second 119' impact beam receiving section, opposed to the first 118 and second 118' double rail receiving section and located at the front of the vehicle frame;

left 120 and right 120' first box supports each comprising a hollow quadrangular piece having a first end having a box support member 121, 121' and a second end having a rounded rail receiving section facing to the internal end of the automotive frame and welded to the superior portion of a main rail 1, 1' between the gas tank transversal support beam 70 and the third transversal support beam 18;

left and right second box supports 122, 122', comprising a pair of parallel planar members having a first straight inclined side, a second side having a rounded shape and a superior horizontal side and a quadrangular horizontal planar member 123, 123' joined to the superior horizontal side of both parallel planar member, wherein each second side is welded to a main rail 1, 1' facing to the external side of the vehicle frame between the second 17 and third 18 transversal support beam;

left and right third box supports 124, 124', each comprising a channel shaped member having an horizontal rectangular planar wall and a first and a second lateral walls depending from the vertical quadrangular member, having half of the length of the rectangular planar member and an internal and an external side and a pair of perforations 125, 125' at its central portion, wherein each third box support 124, 124' is welded to the superior portion of a main rail 1, 1', between the first 16 and second 17 transversal support beam, and wherein the main rail 1, 1' remains located between the internal side of both lateral walls;

left and right fourth box supports 126, 126' each comprising a channel shaped member having a vertical rectangular planar wall and a first and a second lateral walls depending from the rectangular planar wall, having half of the length of the rectangular planar member and an internal and an external side, wherein each fourth box support is welded to the lateral portion of a main rail 1, 1' with the external side of the vertical rectangular planar member facing the external side of the vehicle frame, near the second end of a main rail 1, 1', and wherein the main rail 1, 1' remains located between the internal side of both lateral sides;

a first and a second rear fender support 127, 127' each comprising a channel shaped piece comprising a vertical wall and two lateral horizontal walls depending from the vertical wall, said first and second rear defense supports welded to the second end 3, 3' tip of a main rail 1, 1';

a left and right shock absorber support 128, 128' having a pyramidal shape and having a rail receiving section, wherein the left shock absorber 128 is welded to the first main rail 1 facing the internal side of the vehicle frame and located between the second 17 and third 18 transversal beams and wherein the right 128' shock absorber is welded to the second main 1' rail facing the internal side of the vehicle and located between the right third box support 124' and the second transversal beam 17;

Each of the perforations and bolt receiving members of each half clamp receives a provisional bolt-nut assembly for pressing the half clamps that were joined by an adherent substance to a rail while the adherent substance is fresh. Once the adherent substance hardens, all the joining force is applied by the adherent substance at the points in which it was applied.

In a preferred embodiment of the present invention, all the components of the vehicle frame may be made of cast metal, which lowers the weight of the entire structure, although they can be made of metallic alloys or any other suitable material.

Furthermore, the front of the vehicle frame may attach any front suspension support structure design depending of the current necessities, without changing the configuration of the vehicle frame.

Also, depending of the vehicle to which the frame will be adapted, the number and design of each transversal support beam or other support members may be changed.

The central rail is used in this embodiment to provide extra reinforcement to the vehicle frame, but other embodiments may not have it, and instead they may use other means to provide an extra reinforcement to the vehicle frame.

Finally it must be understood that the automotive frame of the present invention, is not limited exclusively to the above described and illustrated embodiments and that the persons having ordinary skill in the art can, with the teaching provided by this invention, be enabled to make modifications to the design and component distribution of the automotive frame of the present invention, which will clearly be within the true inventive concept and scope of the invention which is claimed in the following claims.

What is claimed is:

1. A vehicle frame structure, comprising:
   a pair of parallel spaced apart rails; and
   a plurality of transversal support beams whose opposite ends are each joined to a respective one of said rails with a joining member, each said joining member forming, with one of the ends of a respective one of said support beams, a clamp joint that surrounds and links a respective one of said rails,
   wherein said joining members and said one of the ends of the respective one of said support beams are joined to each other with an adherent substance and with linking means for mechanically linking them together, and wherein said joining members and said one of the ends of the respective one of said support beams are joined to the respective one of said rails with an adherent substance.

2. A vehicle frame structure as claimed in claim 1, wherein said linking means includes a bolt-nut assembly which helps to maintain the clamp joint in place while the adherent substance is fresh.

3. A vehicle frame structure as claimed in claim 1, including an additional longitudinal and central rail joined to both said rails by means of one or more of said transversal support beams.

4. A vehicle frame structure as claimed in claim 1 wherein each of said rails comprises a double rail having a main rail and a parallel secondary rail joined to the main rail.

5. A vehicle frame structure as claimed in claim 1 having five transversal support beams comprising a first, second and third transversal support beam, a gas tank transversal support beam and a transmission support beam and further including a first and a second $1^{st}$ box supports each welded to each rail between the gas tank transversal support beam and the third transversal support beam.

6. A vehicle frame structure as claimed in claim 1 having five transversal support beams comprising a first, second and third transversal support beam, a gas tank transversal support beam and a transmission support beam and further including a first and a second $2^{nd}$ box supports each welded to each rail between the second and third transversal support beam.

7. A vehicle frame structure as claimed in claim 1, having five transversal support beams comprising a first, second and third transversal support beam, a gas tank transversal support beam and a transmission support beam and further including a first and a second $3^{rd}$ box supports each welded to each rail between the first and second transversal support beam.

8. A vehicle frame structure as claimed in claim 1 having five transversal support beams comprising a first, second and third transversal support beam, a gas tank transversal support beam and a transmission support beam and further including a first and a second $4^{th}$ box supports each welded to each rail near an end of a main rail.

9. A vehicle frame structure as claimed in claim 1 having five transversal support beams comprising a first, second and third transversal support beam, a gas tank transversal support beam and a transmission support beam and further including a first and a second $3^{rd}$ box supports each welded to each rail between the first and second transversal support beam and a first and a second shock absorber support, wherein the first shock absorber support is welded to a rail between the second and third transversal beams and the second shock absorber is welded to an opposed rail between the second $3^{rd}$ box support and the second transversal beam.

10. A vehicle frame structure having a front, rear, superior and an inferior end and an internal and an external side, comprising:

a first and a second spaced apart parallel double rails each having a first and a second end comprising a first and a second main rail each having a first and a second end corresponding to the front and rear of the vehicle frame respectively and a circular cross section;

a first and a second secondary rail each having a first and a second end corresponding to the front and rear of the vehicle frame respectively, and a circular cross section, wherein the second end is welded to the first end of a main rail;

a central rail having a first and a second end, and a central portion, located between the first and second double rail and linked to them by means of a first, second and third transversal support beam;

a first transversal support beam having a first and a second end and a central "O" ring for receiving the cross section of the central rail and further including a first and a second half clamp at each end;

a first and a second rear spring support each including a first and a second half clamp, each closing a half clamp of the first transversal support beam forming a first and a second rear spring support "O" shaped ring for receiving and joining the cross section of a main rail by means of an adherent substance and thus joining both double bars;

a second transversal support beam having a first and a second end and a central "O" ring for receiving the cross section of the central rail central portion and further including a first and a second half clamp at each end;

a first and a second rear axle auxiliary support each including a first and a second half clamp, each closing a half clamp of the second transversal support beam forming a first and a second rear axle auxiliary support "O" shaped ring for receiving and joining the cross section of a main rail by means of an adherent substance and thus joining both double bars;

a third transversal support beam having a first and a second end and a central "O" ring for receiving the central rail cross section and further including a first and a second half clamp at each end;

a first and a second front spring support each including a first and a second half clamp, each closing a half clamp of the third transversal support beam forming a first and a second front spring support "O" shaped ring for receiving and joining the cross section of a main rail by means of an adherent substance, and thus joining both double bars;

a gas tank transversal support beam having a first and a second end, each including a pair of half clamps;

a first and a second $2nd^t$ cabin support, each including a pair of half clamps, each pair closing a pair of half clamps of the gas tank transversal, support beam, forming a $2nd^t$ cabin support first and a second pair of "O" rings for receiving and joining the cross section of a main rail at approximately its half third quarter portion and the cross section of the secondary crossbar at approximately its central portion respectively by means of an adherent substance, and thus joining both double bars;

a transmission support beam having linking means;

a first and a second $1^{st}$ cabin support, and a cabin support linking member for each $1^{st}$ cabin support, for linking each main and secondary crossbar, the transmission support beam and thus both double bars together; and a front suspension support frame having a first and a second double rail receiving sections for joining the first end of the main and secondary rails and both double rails together and further including a first and a second impact beam receiving section, opposed to the first and second double rail receiving sections.

11. A vehicle frame structure according to claim 10, wherein:
the main rail has four equal length portions, a straight section beginning at the second end and finishing at approximately one quarter of the length of the main rail and a bent section slightly bent towards below and towards the external side of the automotive frame, beginning at the end of the straight section and finishing at the first end of the main rail; and
the secondary rail has four equal length portions, a first and a second end bent sections slightly bent towards below of the automotive frame, and each located at the first and second end of the secondary rail respectively, and a central straight section.

12. A vehicle frame structure according to claim 11, wherein: the central "O" ring of the first transversal support beam receives the cross section of the central rail at its second end; the first and a second rear spring support "O" shaped ring receives the cross section of a main rail at its second; the central "O" ring of the second transversal support beam receives the cross section of the central rail at its central portion; the first and a second rear axle auxiliary support "O" shaped ring receives the cross section of a main rail at its first quarter portion; and the central "O" ring of the third transversal support beam receives the cross section of the central rail at its first end; the first and a second front spring support "O" shaped ring receives the cross section of a main rail at a central portion of its second bent section; the 2nd$^r$ cabin support first and a second pair of "O" rings receives the cross section of a main rail at an approximately half third quarter portion and the cross section of the secondary crossbar at a central portion respectively; and the first and a second 1$^{st}$ cabin support, and both cabin support linking members receives the cross section of a main rail and secondary rail at a last quarter portion.

13. A vehicle frame structure according to claim 10, wherein the first transversal support beam comprising a first and a second longitudinal and parallel elongated members, each slightly bent at a central portion towards below of the automotive frame and having a first and a second end, and joined at its central portion by means of a central "O" ring for receiving the second end of the central rail and by means of two half clamps each vertically oriented and opened to the external side of the automotive frame, joining the first and second end of the elongated members, and having a superior and inferior bolt receiving member.

14. A vehicle frame structure according to claim 13, wherein the first and a second rear spring support, each having a spring support element and a half clamp vertically oriented and opened to the internal side of the automotive frame, wherein the half clamp and the spring support are connected by means of a flat elongated piece and two curved elongated pieces each joined by one of its end to an end of the half clamp and joined together by its opposite ends for joining the spring support element, and wherein each half clamp includes a superior and a inferior bolt receiving member, and closes the half clamps of the first transversal support beam in such way that each one of its bolt receiving members coincide and receive a bolt-nut assembly thus forming and "O" shaped ring for receiving and joining the cross section of a main rail by means of an adherent substance applied to the "O" shaped ring thus joining the second end of the main rails and the central rail at its second end.

15. A vehicle frame structure according to claim 10, wherein the second transversal support beam serves as a spare tire support, and comprises a first and a second longitudinal and parallel elongated member each slightly bent at its central portion towards below of the automotive frame and each having a first and a second end, and each joined to each other at its central portion by means of a central "O" ring for receiving the cross section of the central rail at a central portion thereof and by means of two half clamps vertically oriented and opened to the external side of the, automotive frame, joining the first and second end of the elongated members, each having a superior and inferior bolt receiving member.

16. A vehicle frame structure according to claim 15, wherein the first and second rear axle auxiliary support each comprising a triangular frame having an horizontal side, a vertical side and an inclined side wherein the vertical side comprises a half clamp vertically oriented and opened to the internal side of the vehicle frame, each one having a superior and an inferior bolt receiving member and an opposite edge including a rear axle support element, and wherein each half clamp closes the first and second half clamps of the second transversal support beam in such way that its bolt receiving members coincide and receive a bolt-nut assembly, thus forming and "O" shaped ring for receiving and joining the cross section of a main rail by means of an adherent substance applied to the "O" ring thus joining the first and second main rails and the central rail together.

17. A vehicle frame structure according to claim 10, wherein the third transversal support beam serves as an auxiliary gas tank support, and comprises a first and a second longitudinal and parallel elongated members each having a first and a second end and bent at its central portion forming a non-pronounced inverted "V" shaped piece, each joined at a central portion thereof by means of a central "O" ring for receiving the first end of the central rail cross section and by means of a first pair of half clamps each vertically oriented, opened to the internal side of the frame and having a superior and an inferior bolt receiving member, joining the ends of the elongated members and wherein the first and second end of the second elongated member each including a prolongation bent at an angle of 90° for joining one half clamp of a second pair of half clamps, each located below and next to one of the first pair of half clamps and each having a superior and an inferior bolt receiving member.

18. A vehicle frame structure according to claim 17, wherein each first and a second front spring support having a first end including a spring support element and a second end including a first and a second half clamp located below the first half clamp, forming a pair of half clamps, each vertically oriented, opened to the internal side of the frame and including a superior and an inferior bolt receiving member, all connected by a triangular shaped frame wherein the pair of half clamps of each spring support close a corresponding pair of half clamps of the third transversal support beam in such way that its bolt receiving members coincide and receive a bolt-nut assembly, thus forming a first and a second "O" shaped ring for receiving and joining the cross section of a main rail and the cross section of a secondary rail by means of an adherent substance applied to each "O" ring thus joining each main and secondary rail of each double rail and both double rails together.

19. A vehicle frame structure according to claim 10, wherein the gas tank transversal support beam comprising a first and a second longitudinal and parallel elongated member, each having a first and a second end, wherein the first elongated member is bent at its central portion forming a non-pronounced inverted "V" shaped piece and the second elongated member is bent at its central portion forming a pronounced inverted "V" shaped piece, both joined by its central portion by means of two vertical and parallel elongated members each having a first end and a second end and each having a perforation (not shown) at its second end, thus forming a central "H" shaped pattern, and further including a first pair of half clamps, joined at both ends of the first longitudinal elongated member and a second pair of half clamps joined at both ends of the second longitudinal elongated member, each opened to the external side of the automotive frame.

20. A vehicle frame structure according to claim 17, wherein each 2nd$^t$ cabin support having a closed "V" shape comprised by a first and a second main elongated metallic members and a superior planar elongated member closing the "V" shape and forming a cabin support having a pallet shape including a bore in its widest portion, wherein the union of the superior planar elongated member with the first main elongated metallic member include a first half clamp opened to an internal side of the vehicle frame and the union of the first and second main elongated members forms a second half clamp opened to the internal side of the frame, each including a superior and an inferior bolt receiving member and each closing a half clamp of the first and second pair of half clamps of the gas tank transversal support beam respectively, in such way that its bolt receiving members coincide and receive a bolt nut assembly, thus forming a first and a second "O" ring receiving and joining the cross section of a main rail and the cross section of the secondary crossbar by means of an adherent substance applied to the first and second "O" rings, thus joining the main and secondary rails of each double rail and both double rails together.

21. A vehicle frame structure according to claim 10, wherein each 1$^{st}$ cabin support comprising a semi-solid polygonal triangular shaped piece having a first and a second lateral triangular planar member each having a width and including a vertical side having a superior and an inferior end, an horizontal side having a first and a second end and an inclined side having a first and a second end, a superior elongated member joined between both lateral triangular planar members at the edges of the first end of its vertical side, forming a first and a second vertically oriented half clamp for receiving a main rail, each facing to an internal side of the frame member and having a superior and an inferior end, an inferior horizontal pentagonal shaped planar member' having a circular opening in a central portion thereof, joined between both lateral triangular planar members at the edge thereof, wherein the first end of the inclined and horizontal sides coincide, a pair of rounded rail receiving sections joined to the second end of the triangular planar member vertical side for receiving and adhering to a secondary rail by means of an adherent substance, a reinforcing structure located between both lateral triangular planar members and between the superior elongated member and the inferior horizontal pentagonal shaped planar member linking them and a first and a second bolt receiving members welded to the tip of the superior end of both clamps and wherein the second triangular planar member has a bore at the second end of its vertical side and a bore near the first end of its horizontal side above the rounded rail receiving sections, and wherein each triangular planar members is slightly inclined with respect to the superior elongated member and the inferior horizontal pentagonal shaped planar member towards the front of the vehicle frame.

22. A vehicle frame structure according to claim 21, wherein each 1$^{st}$ cabin support further including a sole half clamp vertically oriented, opened to the external side of the vehicle frame and having a superior bolt receiving section, said sole half clamp closing the second half clamp of the cabin support superior elongated member, in such way that its bolt receiving members coincide and receive a bolt nut assembly, thus forming an "O" ring receiving and joining the cross section of a main rail by means of an adherent substance applied to the "O" ring.

23. A vehicle frame structure according to claim 10, wherein the transmission support beam comprising an elongated channeled member having an "H" shaped cross section and including a bent inverted "U" shaped central portion and two straight portions at both sides, forming the transmission support beam first and second end, each including a nut receiving perforation, and further including a first, and a second half clamp respectively, horizontally oriented and opened upward, each one joined at the first and second end and each having a nut receiving perforation, wherein each half clamp surrounds the lower portion of a secondary rail and is linked to a 1$^{st}$ cabin support.

24. A vehicle frame structure according to claim 21, wherein the transmission support beam comprising an elongated channeled member having an "H" shaped cross section and including a bent inverted "U" shaped central portion and two straight portions at both sides, forming the transmission support beam first and second end, each including a nut receiving perforation, and further including a first, and a second half clamp respectively, horizontally oriented and opened upward, each one joined at the first and second end and each having a nut receiving perforation, wherein each half clamp surrounds the lower portion of a secondary rail and is linked to a 1$^{st}$ cabin support, by means of a nut-bolt assembly passing trough the nut receiving section and trough the perforation located at the second end of the cabin support rectangular planar member horizontal side which coincide with the nut receiving perforation.

25. A vehicle frame structure according to claim 21, wherein each cabin support linking member comprising a vertical planar member having a superior end including a vertical half clamp opened to the external side of the automotive frame having a bolt receiving member at its tip, for receiving a main rail and an inferior end including a rounded rail receiving section for receiving a secondary rail wherein each vertical planar member including a bolt receiving perforation near its second end and wherein the rounded rail receiving section having an horizontal bolt receiving member at its end and wherein the half clamp close the first cabin support half clamp in such way that both bolt receiving members coincide and receive a bolt-nut assembly thus forming an "O" ring receiving and joining the cross section of a main rail by means of an adherent substance applied to the "O" ring, and the rounded rail receiving section is adhered to the secondary rail by means of an adherent substance.

26. A vehicle frame structure according to claim 10, further including left and right first box supports each comprising a hollow quadrangular piece having a first end having a box support member and a second end having a rounded rail receiving section facing to the internal end of the automotive frame and welded to a superior portion of a main rail between the gas tank transversal support beam and the third transversal support beam.

27. A vehicle frame structure according to claim 10, further including left and right second box supports, comprising a pair of parallel planar members having a first straight inclined side, a second side having a rounded shape and a superior horizontal side and a quadrangular horizontal planar member joined to the superior horizontal side of both parallel planar member, wherein each second side is welded to a main rail facing to the external side of the vehicle frame between the second and third transversal support beam.

28. A vehicle frame structure according to claim 10, further including left and right third box supports, each comprising a channel shaped member having an horizontal rectangular planar wall and a first and a second lateral walls depending from the vertical quadrangular member, having half of the length of the rectangular planar member and an internal and an external side and a pair of perforations at its central portion, wherein each third box support is welded to a superior portion of a main rail, between the first and second transversal support beam, and wherein the main rail remains located between the internal side of both lateral walls.

29. A vehicle frame structure according to claim 10, further including left and right fourth box supports each comprising a channel shaped member having a vertical rectangular planar wall and a first and a second lateral walls depending from the rectangular planar wall, having half of the length of the rectangular planar member and an internal and an external side, wherein each fourth box support is welded to the lateral portion of a main rail with the external side of the vertical rectangular planar member facing the external side of the vehicle frame, near the second end of a main rail, and wherein the main rail remains located between the internal side of both lateral sides.

30. A vehicle frame structure according to claim 10, further including a first and a second rear fender support each comprising a channel shaped piece comprising a vertical wall and two lateral horizontal walls depending from the vertical wall, said first and second rear defense supports welded to a second end tip of a main rail.

31. A vehicle frame structure according to claim 10, further including a left and right shock absorber support having a pyramidal shape and having a rail receiving section, wherein the left shock absorber is welded to a first main rail facing the internal side of the vehicle frame and located between the second and third transversal beams and wherein the right shock absorber is welded to a second main rail facing the internal side of the vehicle and located between the right third box support and the second transversal beam.

* * * * *